US012810653B2

(12) United States Patent
Yang

(10) Patent No.: US 12,810,653 B2
(45) Date of Patent: Nov. 24, 2026

(54) OBJECT DETECTION METHOD, ELECTRONIC APPARATUS AND GESTURE DETECTION SYSTEM

(71) Applicant: Cupola360 INC., Hsinchu City (TW)

(72) Inventor: Kaiqi Yang, Hsinchu City (TW)

(73) Assignee: Cupola360 INC., Hsinchu City (TW)

( * ) Notice: Subject to any disclaimer, the term of this patent is extended or adjusted under 35 U.S.C. 154(b) by 261 days.

(21) Appl. No.: 18/657,702

(22) Filed: May 7, 2024

(65) Prior Publication Data

US 2025/0322696 A1 Oct. 16, 2025

(30) Foreign Application Priority Data

Apr. 11, 2024 (TW) ................................ 113113484

(51) Int. Cl.
*G06V 40/20* (2022.01)
*G06F 3/01* (2006.01)
(Continued)

(52) U.S. Cl.
CPC .............. *G06V 40/28* (2022.01); *G06V 40/11* (2022.01); *G06V 40/165* (2022.01); *G06F 3/017* (2013.01); *G06V 10/82* (2022.01)

(58) Field of Classification Search
CPC ...... G06V 40/28; G06V 40/11; G06V 40/165; G06V 10/82; G06F 3/017
See application file for complete search history.

(56) References Cited

U.S. PATENT DOCUMENTS

2012/0162409 A1* 6/2012 Setiawan ................ G06F 3/011
348/135
2013/0016910 A1* 1/2013 Murata .............. H04N 21/8583
382/195
(Continued)

FOREIGN PATENT DOCUMENTS

CN 110807361 2/2020
CN 114677753 6/2022
(Continued)

OTHER PUBLICATIONS

"Office Action of Taiwan Counterpart Application", issued on Sep. 30, 2024, p. 1-p. 12.

*Primary Examiner* — Chan S Park
*Assistant Examiner* — Daniel C Chang
(74) *Attorney, Agent, or Firm* — JCIPRNET

(57) ABSTRACT

An object detection method, electronic apparatus and gesture detection system are provided. A processor is configured to implement the following steps, including: executing an object detection module to detect an original image, and obtaining a first position information, a second position information and a third position information related to the same human body object from the original image through the object detection module; setting a valid determination range based on at least one of the first position information and the second position information; obtaining a hand position in the original image based on the third position information; in response to the hand position being within the valid determination range, executing a gesture recognition module; and in response to the hand position not being within the valid determination range, not executing the gesture recognition module.

15 Claims, 5 Drawing Sheets

(51) Int. Cl.

| | |
|---|---|
| ***G06V 10/82*** | (2022.01) |
| ***G06V 40/10*** | (2022.01) |
| ***G06V 40/16*** | (2022.01) |

(56) References Cited

U.S. PATENT DOCUMENTS

| | | | | |
|---|---|---|---|---|
| 2021/0191526 | A1* | 6/2021 | Heo | G06V 40/172 |
| 2021/0319213 | A1 | 10/2021 | Meng et al. | |
| 2023/0027040 | A1* | 1/2023 | Wang | G06F 3/017 |

FOREIGN PATENT DOCUMENTS

| | | | | |
|---|---|---|---|---|
| TW | I496094 | | 8/2015 | |
| WO | WO-2023138403 | A1 * | 7/2023 | G06N 3/08 |

* cited by examiner

OBJECT DETECTION METHOD, ELECTRONIC APPARATUS AND GESTURE DETECTION SYSTEM

CROSS-REFERENCE TO RELATED APPLICATION

This application claims the priority benefit of Taiwan application serial no. 113113484, filed on Apr. 11, 2024. The entirety of the above-mentioned patent application is hereby incorporated by reference herein and made a part of this specification.

BACKGROUND

Technical Field

The disclosure relates to an image recognition mechanism, and in particular relates to an object detection method, an electronic apparatus, and a gesture detection system.

Description of Related Art

Mediapipe Holistic combines three models and related algorithms for body posture, facial landmarks, and hand tracking. It may detect body posture, facial mesh, and palm movements. A complete detection generates 543 detection nodes, including 33 posture nodes, 468 facial nodes, and 21 hand nodes for each hand. However, the computing resources consumed by the above calculation method are quite large, making it difficult to popularize.

In addition, in practical applications, current methods for gesture recognition cannot distinguish meaningful gestures from unconscious human finger movements. Whether it is a conscious gesture towards the camera or a specific object, or an unconscious finger movement, it will be detected and recognized as a gesture. Therefore, existing gesture recognition methods are prone to misjudgment and consume computing resources.

SUMMARY

An object detection method, an electronic apparatus and a gesture detection system, which may reduce misjudgments in gesture recognition and save computing resources, are provided in the disclosure.

The object detection method of the disclosure uses a processor to implement the following operation. An object detection module is executed to detect an original image, and a first position information, a second position information and a third position information related to the same human body object from the original image are obtained through the object detection module. The first position information corresponds to a head area, the second position information corresponds to a body area, and the third position information corresponds to a hand area. A valid determination range is set based on at least one of the first position information and the second position information. A hand position in the original image is obtained based on the third position information. In response to the hand position being within the valid determination range, a gesture recognition module is executed. In response to the hand position not being within the valid determination range, the gesture recognition module is not executed.

In an embodiment of the disclosure, setting the valid determination range includes the following operation. A face width and a face area are calculated based on the first position information corresponding to the head area. A threshold is set based on the face width. The valid determination range is set within a circular range with a center point of the face area as a center and the threshold as a radius.

In an embodiment of the disclosure, calculating the face width includes the following operation. A height of the head area in a vertical direction and a width in a horizontal direction are calculated based on the first position information corresponding to the head area. Whether the obtained face area is a front face or a side face is determined based on a ratio of the height and the width. In response to determining that the face area is the front face, the width is used as the face width. In response to determining that the face area is the side face, the face width is not calculated, and the gesture recognition module is not executed.

In an embodiment of the disclosure, setting the valid determination range includes the following operation. A body length range in a vertical direction is obtained based on the second position information corresponding to the body area. The valid determination range is set according to a preset ratio in the body length range to determine whether the hand position in the vertical direction is within the valid determination range.

In an embodiment of the disclosure, the preset ratio includes a first ratio and a second ratio, and setting the valid determination range according to the preset ratio in the body length range includes the following operation. In response to determining that the human body object is half-body, the valid determination range is set according to the first ratio in the body length range. In response to determining that the human body object is full-body, the valid determination range is set according to the second ratio in the body length range.

In an embodiment of the disclosure, the object detection method further includes the following application. A head size of the head area in the vertical direction is obtained by referring to the first position information. A body length and a body width of the body area are obtained by referring to the second position information. Whether the human body object is half-body or full-body is determined based on the body length, the body width, and the head size.

In an embodiment of the disclosure, setting the valid determination range includes the following operation. A width range in a horizontal direction is obtained based on the second position information corresponding to the body area. A top-of-head position is calculated based on the first position information corresponding to the head area. The valid determination range is set based on an upper area of the top-of-head position and the width range.

In an embodiment of the disclosure, in response to the hand position being within the valid determination range, the gesture recognition module is executed and a gesture recognition result is obtained. A corresponding operation is executed based on the gesture recognition result.

In an embodiment of the disclosure, the operation includes at least one of controlling an action of a physical apparatus and controlling an adjustment of a parameter setting of an electronic apparatus having the processor.

An electronic apparatus of the disclosure includes a communication interface configured to receive an original image and a processor coupled to the communication interface and configured to execute the object detection method.

A gesture detection system of the disclosure includes an imaging apparatus configured to obtain an original image and the electronic apparatus.

Based on the above, by setting the valid determination range, the disclosure may filter out the unconscious or meaningless gesture activities of the user in advance, thereby reducing misjudgments in gesture recognition and saving computing resources.

DETAILED DESCRIPTION OF DISCLOSED EMBODIMENTS

Figure 1:
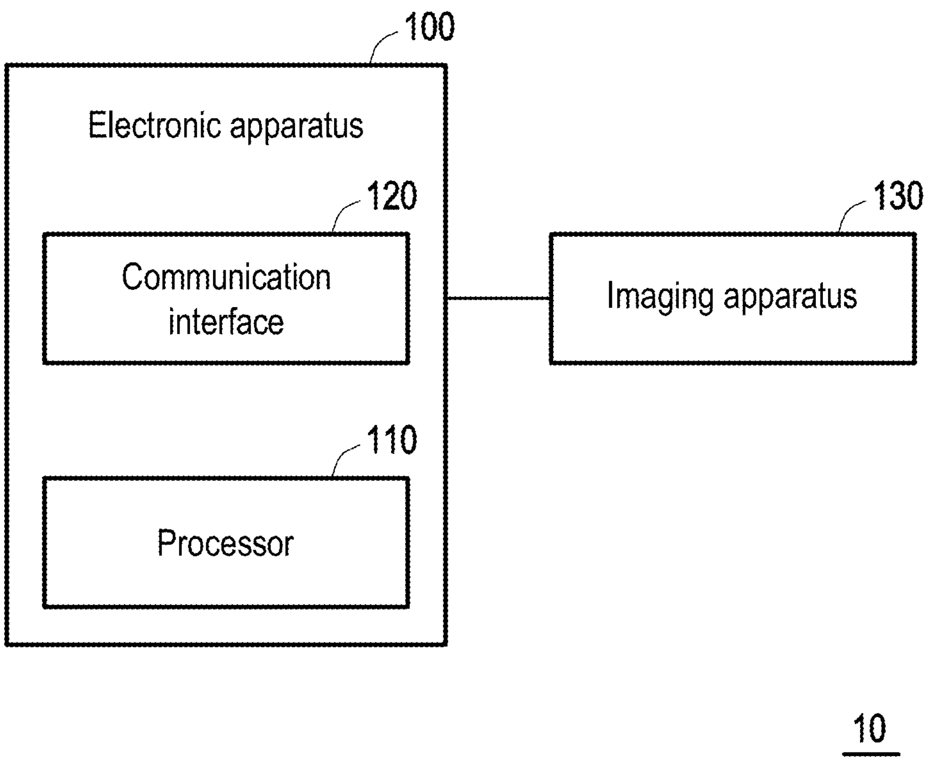
FIG. 1 is a block diagram of a gesture detection system according to an embodiment of the disclosure.

FIG. 1 is a block diagram of a gesture detection system according to an embodiment of the disclosure. Referring to FIG. 1, the gesture detection system 10 includes an electronic apparatus 100 and an imaging apparatus 130. The electronic apparatus 100 is, for example, an electronic apparatus with a computing function such as a smartphone, a tablet, a laptop, or a personal computer. The imaging apparatus 130 is a video camera, a photographic camera, etc. using charge coupled device (CCD) lenses or complementary metal oxide semiconductor transistors (CMOS) lenses. The imaging apparatus 130 may communicatively connect with the electronic apparatus 1001 through wired or wireless means. The electronic apparatus 100 includes a processor 110 and a communication interface 120. The processor 110 is coupled to the communication interface 120. The communication interface 120 is configured to receive an original image from the imaging apparatus 130.

The processor 110 is, for example, a central processing unit (CPU), a graphic processing unit (GPU), a physical processing unit (PPU), a programmable microprocessor, an embedded control chip, digital signal processor (DSP), an application specific integrated circuit (ASIC), or other similar devices.

The communication interface 120 is configured to communicate with other devices or communication networks. The communication network may be an Ethernet network, a radio access network (RAN), or a wireless local area network (WLAN), etc. The communication interface 120 may be a wired communication interface or a wireless communication interface. Specifically, the communication interface 120 may be an Ethernet interface, a fast Ethernet (FE) interface, a gigabit Ethernet (GE) interface, an asynchronous transmission mode (ATM) interface, a wireless local area network (WLAN) interface, a cellular network communication interface, or a combination thereof. The Ethernet interface may be an optical interface, an electrical interface, or a combination thereof. The communication interface 120 may be configured to communicate with network devices and other devices.

In another embodiment, the communication interface 120 is, for example, a network interface card, a high-frequency circuit (RF circuit), a Bluetooth signal transceiver, or an infrared signal transceiver or other wired/wireless signal transceiving device.

The electronic apparatus 100 also includes a memory. The memory may adopt any type of fixed or removable random access memory (RAM), read-only memory (ROM), flash memory, a hard drive or other similar devices or a combination of these devices. The memory includes one or more program code segments. After being installed, the program code segments are executed by the processor 110 to implement the object detection method described below.

Figure 2:
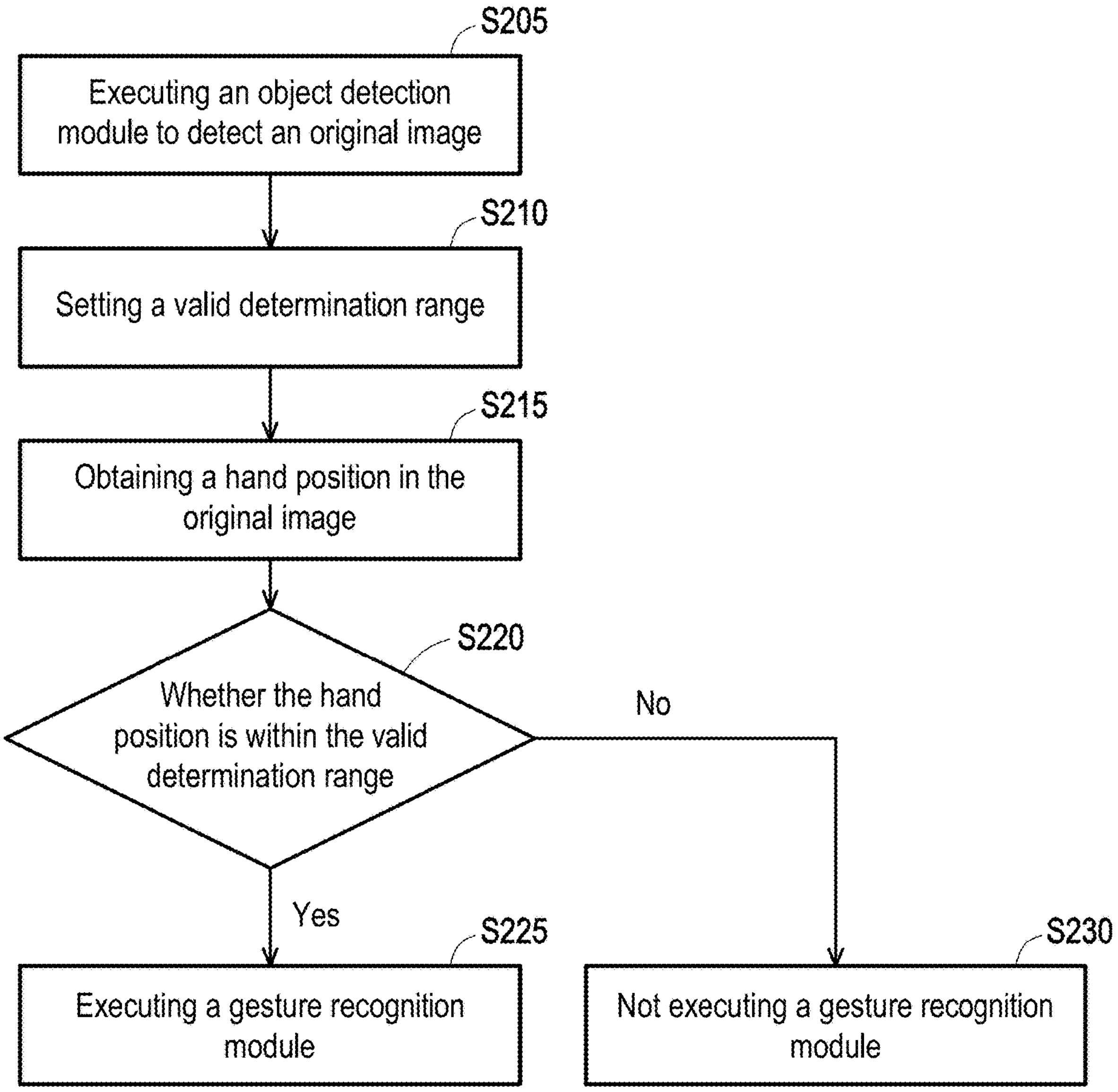
FIG. 2 is a flowchart of an object detection method according to an embodiment of the disclosure.

FIG. 2 is a flowchart of an object detection method according to an embodiment of the disclosure Referring to FIG. 1 and FIG. 2 at the same time, in step S205, the processor 110 executes the object detection module to detect an original image, and obtains a first position information, a second position information and a third position information related to the same human body object from the original image through the object detection module. Here, the first position information corresponds to a head area, the second position information corresponds to a body area, and the third position information corresponds to a hand area. The processor 110 inputs the original image to the object detection module. After recognition by the object detection module, the processor 110 obtains the first position information, the second position information and the third position information respectively corresponding to the head area, the body area, and the hand area. Furthermore, bounding boxes respectively corresponding to the head area, the body area, and the hand area may be marked on the original image based on the first position information, the second position information, and the third position information.

In one embodiment, the object detection module is trained to understand general image knowledge through a large number of sample images in advance. The object detection module is based on the convolution neural network (CNN) architecture, which is divided into three parts: the backbone network, the connection layer (neck), and the detection head. The backbone network is responsible for extracting features from the original image. For example, the backbone network may extract multiple initial feature layers with different scales from the original image from bottom-up. The backbone network may adopt models such as ResNet-18, MobileNetV2-100, and ShuffleNetV2.

The connection layer is configured to reprocess and rationally utilize the important features extracted by the backbone network, such as performing feature extraction of different stages at the same time to facilitate specific task learning of the detection head. The connection layer may include top-down and bottom-up paths. The connection layer may adopt the structure of feature pyramid network (FPN), the structure of bidirectional FPN, etc.

The detection head generates specific outputs according to different detection targets (e.g., body area, head area, and hand area). The detection head is responsible for redrawing the features extracted from the backbone network into several grids of fixed sizes, such as 64×64, 32×32 or 16×16, and then predicting the probability of the occurrence of the object center in each grid, the anchor size, the position, and the category. For example, the detection head includes a classification branch and a bounding box regression branch. The classification branch is configured to obtain the classification probability distribution. The bounding box regression branch is configured to obtain the bounding box position probability distribution.

In this embodiment, during the training stage, multiple bounding boxes corresponding to the body area, head area, and hand area of the same human body object are respectively marked in each training image, and these data are input into the object detection module for training. The detection head is further set to output position information corresponding to the body area, head area, and hand area.

After the object detection module completes training, the processor 110 inputs an original image to be recognized to the object detection module, and then the object detection module may output position information corresponding to the body area, head area, and hand area.

Figure 3:
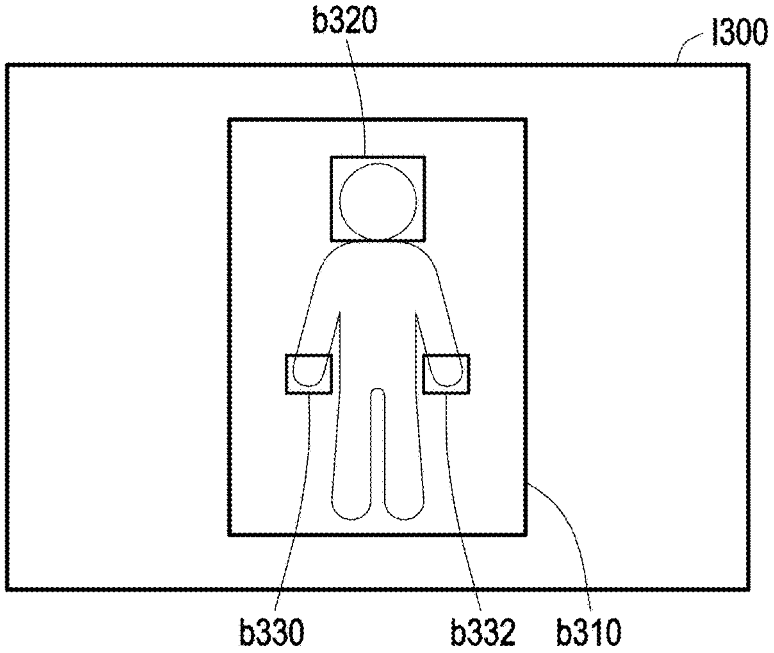
FIG. 3 is a schematic diagram of an original image according to an embodiment of the disclosure.

FIG. 3 is a schematic diagram of an original image according to an embodiment of the disclosure. Referring to FIG. 3, in this embodiment, the detection targets of the object detection module include the head area, body area, and hand area. The processor 110 inputs the original image 1300 to the object detection module. After detection through the object detection module (recognizing the head area, body area, and hand area of the same human body object), the first position information corresponding to the head area, the second position information corresponding to the body area, and the third position information corresponding to the hand area are obtained. After that, the processor 110 marks the bounding box b320 corresponding to the head area, the bounding box b310 corresponding to the body area, and the bounding boxes b330 and b332 corresponding to the hand area (assuming the hands are recognized) in the original image 1300 based on the first location information, the second location information, and the third location information. For example, the first position information includes the upper left coordinate point and the lower right coordinate point of the bounding box b320. The second position information includes the upper left coordinate point and the lower right coordinate point of the bounding box b310. The third position information includes the upper left coordinate point and the lower right coordinate point of the bounding box b330, and the upper left coordinate point and the lower right coordinate point of the bounding box b332.

In this embodiment, the range of the body area (i.e., the range enclosed by the bounding box b310) covers the entire human body object.

Returning to FIG. 2, after obtaining the first location information, the second location information, and the third location information, in step S210, the processor 110 sets a valid determination range based on at least one of the first location information and the second location information. Here, the valid determination range is used to determine whether to execute the gesture recognition module. In one embodiment, the valid determination range may be set for different usage scenarios. The usage scenario may be, for example, a remote monitoring scenario, a game scenario, a conference scenario, etc., but not limited thereto.

Next, in step S215, the processor 110 obtains the hand position in the original image based on the third position information. Taking the original image 1300 as an example, the bounding frames b330 and b332 may be obtained according to the third position information, and the respective center points of the bounding frames b330 and b332 are found as the hand positions of the left and right hands. In other embodiments, arbitrary reference points may also be used to represent the hand positions of the left and right hands in the bounding boxes b330 and b332.

In step S220, the processor 110 determines whether the hand position is within the valid determination range. In response to the hand position being within the valid determination range, in step S225, the processor 110 executes the gesture recognition module. In response to the hand position not being within the valid determination range, in step S230, the processor 110 does not execute the gesture recognition module.

In step S225, the processor 110 executes the gesture recognition module and obtains the gesture recognition result, and then executes a corresponding operation based on the gesture recognition result. The operation include at least one of controlling the action of a physical apparatus and controlling the adjustment of a parameter setting of the electronic apparatus 100. For example, the processor 110 determines to control the imaging apparatus 130 to start or stop recording a video based on the gesture recognition result. Alternatively, the processor 110 determines to control the sound receiving device (microphone) to start or stop receiving sound based on the gesture recognition result. The sound receiving device may be built into the electronic apparatus 100, or may be externally connected to the electronic apparatus 100 through wired or wireless means. Alternatively, the processor 110 determines whether to turn on the speaker of the electronic apparatus 100 based on the gesture recognition result. Alternatively, the processor 110 determines the brightness parameters of the display of the electronic apparatus 100 based on the gesture recognition result.

Examples are listed below to illustrate the setting of the valid determination range.

Figure 4:
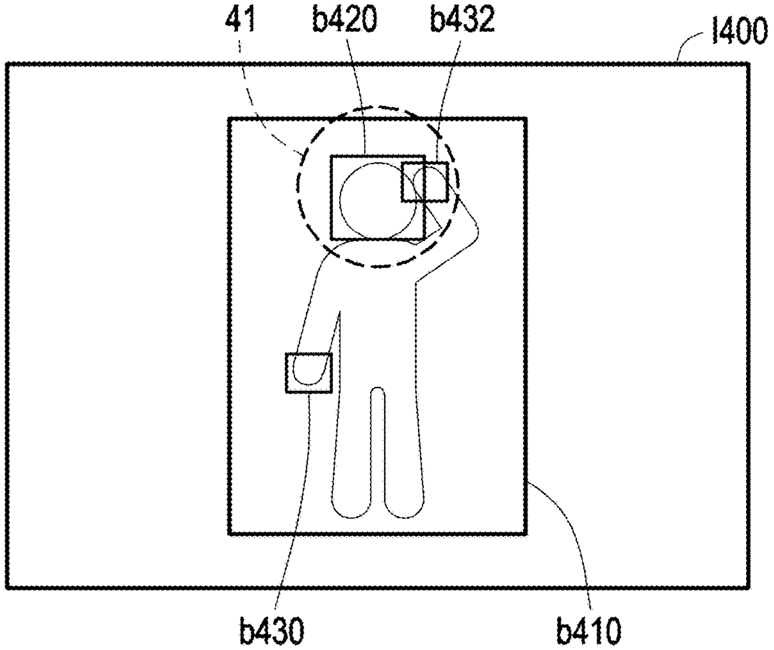
FIG. 4 is a schematic diagram of a first application example of the valid determination range according to an embodiment of the disclosure.

FIG. 4 is a schematic diagram of a first application example of the valid determination range according to an embodiment of the disclosure. Generally speaking, the hand must be close enough to the head to perform a meaningful gesture. Therefore, in the usage scenario of this embodiment, it means that the gesture recognition module will only be executed when the distance between the hand position and the face area is less than a certain extent.

Referring to FIG. 4, in this embodiment, the bounding box b410 corresponding to the body area, the bounding box b420 corresponding to the head area, and the bounding boxes b430 and b432 corresponding to the hand area are marked in the original image I400 through the object detection module.

Specifically, the processor 110 calculates the face width and the face area based on the first position information corresponding to the head area. For example, the range of the face area relative to the head area may be obtained according to a preset ratio obtained by statistics, and then the face width may be obtained from the widest point of the face area in the horizontal direction. Next, the processor 110 sets a threshold based on the face width. For example, 1.5 times the face width is used as the threshold. Then, the processor 110 sets the valid determination range 41 within a circular range with the central point of the face area as the center and the threshold as the radius. In the embodiment shown in FIG. 4, the processor 110 determines that the hand position of one of the hands (the center point position of the bounding box b432) is within the valid determination range 41.

In addition, in human behavior, when performing meaningful gestures, the face must be facing the front, and the gesture cannot be correctly determined when facing sideways. Accordingly, in another embodiment, after obtaining the output result through detection through the object detection module, the processor 110 may further determine whether the face area is a front face or a side face. Specifically, the processor 110 calculates the height in the vertical direction and the width in the horizontal direction of the head region based on the first position information corresponding to the head region, and determines whether the obtained face area is a front face or a side face based on the ratio of height and width. For example, if the ratio of height divided by width is greater than or equal to 2, it is determined to be a side face; if the ratio of height divided by width is less than 2, it is determined to be a front face.

In response to determining that the face area is a front face, the processor 110 uses the width as the face width. In response to determining that the face area is a side face, the face width is not calculated, and the gesture recognition module is not executed.

Figure 5:
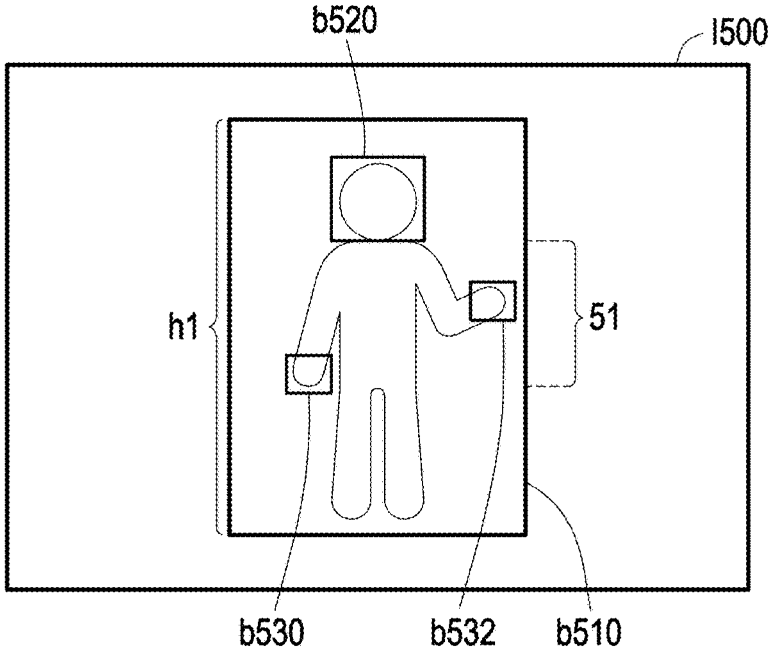
FIG. 5 is a schematic diagram of a second application example of the valid determination range according to an embodiment of the disclosure.
Figure 6:
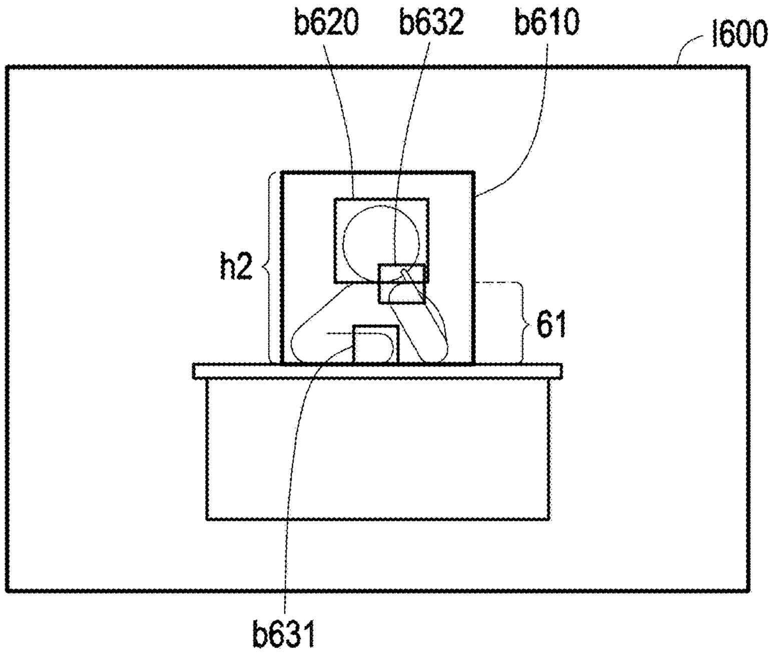
FIG. 6 is a schematic diagram of a third application example of the valid determination range according to an embodiment of the disclosure.

In other usage scenarios, the valid determination range may also be set according to standing and sitting postures. FIG. 5 below illustrates the standing posture, and FIG. 6 illustrates the sitting posture.

FIG. 5 is a schematic diagram of a second application example of the valid determination range according to an embodiment of the disclosure. Referring to FIG. 5, the bounding box b510 corresponding to the body area, the bounding box b520 corresponding to the head area, and the bounding boxes b530 and b532 corresponding to the hand area are marked in the original image 1500 through the object detection module. The applicable usage scenario of this embodiment is, for example, the situation where the imaging apparatus 130 is far away from the human body being photographed, for example, in the usage scenario of object detection in a factory.

Specifically, the processor 110 obtains a body length range h1 in the vertical direction based on the second position information corresponding to the body area. The valid determination range 51 is set according to a preset ratio in the body length range h1 to determine whether the hand position in the vertical direction is within the valid determination range.

In response to the human body object being full-body, it is assumed that the second position information of the body area includes the upper left coordinate point (x1, y1) and the lower right coordinate point (x2, y2), and the body length range h1 is set to y1 to y2. Furthermore, it is assumed that the preset ratio (second ratio) obtained based on statistical data includes ¼ and ½. The two positions $\alpha 1$ and $\beta 1$ in the vertical direction are calculated based on the preset ratio, thereby setting the valid determination range 51 in the range between the two positions $\alpha 1$ and $\beta 1$. That is, $\alpha 1 = y1 + (y2 - y1) \times (1/4)$, $\beta 1 = y1 + (y2 - y1) \times (1/2)$. In the embodiment shown in FIG. 5, the processor 110 determines that the hand position of one of the hands (the center point position of the bounding box b532) is within the valid determination range 51.

The processor 110 obtains the head size of the head area in the vertical direction by referring to the first position information corresponding to the head area, and obtains the body length and body width of the body area by referring to the second position information corresponding to the body area, and then determines whether the human body object is half-body or full-body based on the body length, the body width, and the head size of the body region. For example, when the ratio of the body length to the body width of the body region is less than the first preset value, and the difference between the body length of the body region and the head size is greater than the second preset value, it is determined that the human body object is half-body. When the ratio of the body length to the body width of the body region is not less than the first preset value, and the difference between the body length of the body region and the head size is not greater than the second preset value, it is determined that the human body object is full-body.

FIG. 6 is a schematic diagram of a third application example of the valid determination range according to an embodiment of the disclosure. Referring to FIG. 6, in this embodiment, the bounding box b610 corresponding to the body area, the bounding box b620 corresponding to the head area, and the bounding boxes b631 and b632 corresponding to the hand area are marked in the original image 1600 through the object detection module. The applicable usage scenario of this embodiment is, for example, the situation where the imaging apparatus 130 is relatively close to the human body being photographed, for example, in the usage scenario of object detection in a conference.

Specifically, in response to the human body object being half-body, it is assumed that the second position information of the body area includes the upper left coordinate point (x3, y3) and the lower right coordinate point (x4, y4), and the body length range h2 is set to y3 to y4. Furthermore, it is assumed that the preset ratio (first ratio) obtained based on statistical data includes ½ and 1/1. The two positions $\alpha 2$ and $\beta 2$ in the vertical direction are calculated based on the preset ratio, thereby setting the valid determination range 61 in the range between the two positions $\alpha 2$ and $\beta 2$. That is, $\alpha 2 = y3 + (y4 - y3) \times (1/2)$, $\beta 2 - y3 + (y4 - y3) \times 1$. In the embodiment shown in FIG. 6, the processor 110 determines that the hand position of one of the hands (the center point position of the bounding box b632) is within the valid determination range 61.

Figure 7:
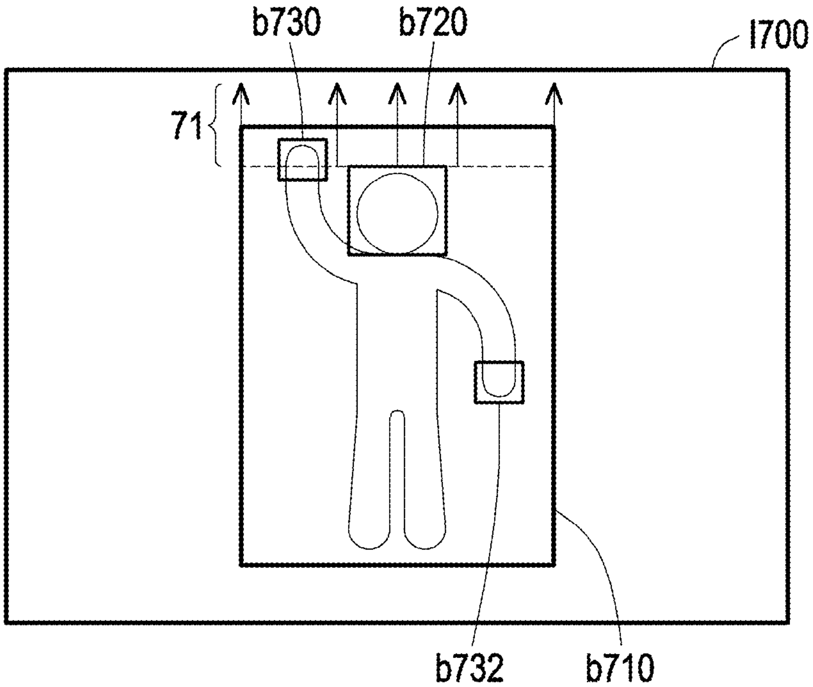
FIG. 7 is a schematic diagram of a fourth application example of the valid determination range according to an embodiment of the disclosure.

FIG. 7 is a schematic diagram of a fourth application example of the valid determination range according to an embodiment of the disclosure. Referring to FIG. 7, in this embodiment, the bounding box b710 corresponding to the body area, the bounding box b720 corresponding to the head area, and the bounding boxes b730 and b732 corresponding to the hand area are marked in the original image 1700 through the object detection module.

Specifically, the processor 110 obtains a width range in the horizontal direction based on the second position information corresponding to the body area. A top-of-head position is calculated based on the first position information corresponding to the head area. The valid determination range 71 is set based on an upper area of the top-of-head position and the width range.

For example, it is assumed that the second position information of the body area includes the upper left coordinate point (x5, y5) and the lower right coordinate point (x6, y6), and the body width range is set to x5 to x6. Assuming that the top-of-head position is at y0, the area between x5 and x6 and above y0 is set as the valid determination range 71. In the embodiment shown in FIG. 7, the processor 110 determines that the hand position of one of the hands (the center point position of the bounding box b730) is within the valid determination range 71.

In addition, in another embodiment, it may also be set as follows: in response to the bounding box (b730 or b732) of the hand area being located above the head, and the center point of the bounding box of the hand region (b730 or b732) falling within the width range of the bounding box b710 corresponding to the body, the gesture recognition module is executed. Moreover, when the recognized gesture matches the preset gesture (e.g., making a fist, spreading the palm), the corresponding operation is executed. For example, in response to the processor 110 determining through the object detection module and the gesture recognition module that the user has made a first with one of the hands and raised it above the head, the imaging apparatus 130 is controlled to start recording a video. In response to the processor 110 determining through the object detection module and the gesture recognition module that the user has spread the palm of one of the hands and raised it above the head, the imaging apparatus 130 is controlled to stop recording the video.

To sum up, by setting the valid determination range, the disclosure may filter out the unconscious or meaningless gesture activities of the user in advance, thereby reducing misjudgments in gesture recognition and saving computing resources.

What is claimed is:

1. An object detection method, using a processor to implement following steps, comprising:

executing an object detection module to detect an original image, and obtaining a first position information, a second position information, and a third position information related to a same human body object from the original image through the object detection module, wherein the first position information corresponds to a head area, the second position information corresponds to a body area, and the third position information corresponds to a hand area;

setting, for each of a plurality of scenarios, a valid determination range based on at least one of the first position information or the second position information;

obtaining a hand position in the original image based on the third position information;

in response to the hand position being within the valid determination range, executing a gesture recognition module; and in response to the hand position not being within the valid determination range, not executing the gesture recognition module, wherein in a first scenario of the plurality of scenarios, setting the valid determination range comprises:

calculating a face area, a height of the head area in a vertical direction and a width of the head area in a horizontal direction based on the first position information corresponding to the head area;

determining whether the face area is a front face or a side face based on a ratio of the height and the width:

in response to determining that the face area is the front face, using the width as a face width;

setting a threshold based on the face width; and setting the valid determination range within a circular range with a center point of the face area as a center and the threshold as a radius, wherein in response to determining that the face area is the side face, the face width is not calculated, and the gesture recognition module is not executed.

2. The object detection method according to claim 1, wherein in a second scenario of the plurality of scenarios, setting the valid determination range based on at least one of the first position information or the second position information comprises:

obtaining a body length range in the vertical direction based on the second position information corresponding to the body area; and setting the valid determination range according to a preset ratio in the body length range to determine whether the hand position in the vertical direction is within the valid determination range.

3. The object detection method according to claim 2, wherein the preset ratio comprises a first ratio and a second ratio, and setting the valid determination range according to the preset ratio in the body length range comprises:

in response to determining that the human body object is half-body, setting the valid determination range according to the first ratio in the body length range; and in response to determining that the human body object is full-body, setting the valid determination range according to the second ratio in the body length range.

4. The object detection method according to claim 3, further comprising:

obtaining a head size of the head area in the vertical direction by referring to the first position information;

obtaining a body length and a body width of the body area by referring to the second position information; and determining whether the human body object is half-body or full-body based on the body length, the body width, and the head size.

5. The object detection method according to claim 1, wherein in a third scenario of the plurality of scenarios, setting the valid determination range based on at least one of the first position information and the second position information comprises:

obtaining a width range in the horizontal direction based on the second position information corresponding to the body area;

calculating a top-of-head position based on the first position information corresponding to the head area; and setting the valid determination range based on an upper area of the top-of-head position and the width range in the horizontal direction.

6. The object detection method according to claim 1, wherein in response to the hand position being within the valid determination range, comprising:

executing the gesture recognition module and obtaining a gesture recognition result; and executing a corresponding operation based on the gesture recognition result.

7. The object detection method according to claim 6, wherein the operation comprises at least one of controlling an action of a physical apparatus and controlling an adjustment of a parameter setting of an electronic apparatus having the processor.

8. An electric apparatus, comprising:

a communication interface, configured to receive an original image; and a processor, coupled to the communication interface, and configured to:

execute an object detection module to detect the original image, and obtain a first position information, a second position information, and a third position information related to a same human body object from the original image through the object detection module, wherein the first position information corresponds to a head area, the second position information corresponds to a body area, and the third position information corresponds to a hand area;

set, for each of a plurality of scenarios, a valid determination range based on at least one of the first position information or the second position information;

obtain a hand position in the original image based on the third position information;

in response to the hand position being within the valid determination range, execute a gesture recognition module; and in response to the hand position not being within the valid determination range, not execute the gesture recognition module, wherein in a first scenario of the plurality of scenarios, the processor is further configured to:

calculate a face area, a height of the head area in a vertical direction and a width of the head area in a horizontal direction based on the first position information corresponding to the head area;

determine whether the face area is a front face or a side face based on a ratio of the height and the width;

in response to determining that the face area is the front face, use the width as a face width;

set a threshold based on the face width; and set the valid determination range within a circular range with a center point of the face area as a center and the threshold as a radius, wherein in response to determining that the face area is the side face, the face width is not calculated, and the gesture recognition module is not executed.

9. The electric apparatus according to claim 8, wherein in a second scenario of the plurality of scenarios, the processor is configured to:

obtain a body length range in the vertical direction based on the second position information corresponding to the body area; and set the valid determination range according to a preset ratio in the body length range to determine whether the hand position in the vertical direction is within the valid determination range.

10. The electric apparatus according to claim 9, wherein the preset ratio comprises a first ratio and a second ratio, the processor is configured to:

in response to determining that the human body object is half-body, set the valid determination range according to the first ratio in the body length range; and in response to determining that the human body object is full-body, set the valid determination range according to the second ratio in the body length range.

11. The electric apparatus according to claim 10, wherein the processor is configured to:

obtain a head size of the head area in the vertical direction by referring to the first position information;

obtain a body length and a body width of the body area by referring to the second position information; and determine whether the human body object is half-body or full-body based on the body length, the body width, and the head size.

12. The electric apparatus according to claim 8, wherein in a third scenario of the plurality of scenarios, the processor is configured to:

obtain a width range in the horizontal direction based on the second position information corresponding to the body area;

calculate a top-of-head position based on the first position information corresponding to the head area; and set the valid determination range based on an upper area of the top-of-head position and the width range in the horizontal direction.

13. The electric apparatus according to claim 8, wherein the processor is configured to:

execute the gesture recognition module and obtain a gesture recognition result; and execute a corresponding operation based on the gesture recognition result.

14. The electric apparatus according to claim 13, wherein the operation comprises at least one of controlling an action of a physical apparatus and controlling an adjustment of a parameter setting of the electronic apparatus.

15. A gesture detection system, comprising:

an imaging apparatus, configured to obtain an original image; and an electronic apparatus, comprising:

a communication interface, configured to receive the original image from the imaging apparatus; and a processor, coupled to the communication interface, and configured to execute an object detection module to detect the original image, and obtain a first position information, a second position information, and a third position information related to a same human body object from the original image through the object detection module, wherein the first position information corresponds to a head area, the second position information corresponds to a body area, and the third position information corresponds to a hand area;

set, for each of a plurality of scenarios, a valid determination range based on at least one of the first position information or the second position information;

obtain a hand position in the original image based on the third position information;

in response to the hand position being within the valid determination range, execute a gesture recognition module; and in response to the hand position not being within the valid determination range, not execute the gesture recognition module, wherein in a first scenario of the plurality of scenarios, the processor is further configured to:

calculate a face area, a height of the head area in a vertical direction and a width of the head area in a horizontal direction based on the first position information corresponding to the head area;

determine whether the face area is a front face or a side face based on a ratio of the height and the width;

in response to determining that the face area is the front face, use the width as a face width;

set a threshold based on the face width; and set the valid determination range within a circular range with a center point of the face area as a center and the threshold as a radius, wherein in response to determining that the face area is the side face, the face width is not calculated, and the gesture recognition module is not executed.

* * * * *